(12) United States Patent
Soga

(10) Patent No.: US 8,635,479 B2
(45) Date of Patent: Jan. 21, 2014

(54) APPARATUS, SYSTEM, AND METHOD OF POWER SAVING CONTROL, AND POWER SAVING CONTROL PROGRAM

(75) Inventor: Hiroshi Soga, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 300 days.

(21) Appl. No.: 13/023,768

(22) Filed: Feb. 9, 2011

(65) Prior Publication Data
US 2011/0208986 A1 Aug. 25, 2011

(30) Foreign Application Priority Data
Feb. 19, 2010 (JP) ................. 2010-035189

(51) Int. Cl.
*G06F 1/00* (2006.01)
*G06F 1/26* (2006.01)
*G06F 1/32* (2006.01)

(52) U.S. Cl.
USPC ............................ 713/323; 713/320; 713/324

(58) Field of Classification Search
USPC ................................................. 713/300–340
See application file for complete search history.

(56) References Cited

U.S. PATENT DOCUMENTS

| | | | | |
|---|---|---|---|---|
| 5,811,890 | A * | 9/1998 | Hamamoto | 307/66 |
| 6,493,780 | B2 * | 12/2002 | Hsu | 710/260 |
| 7,376,853 | B2 * | 5/2008 | Akiba | 713/324 |
| 7,543,165 | B2 * | 6/2009 | Inoue | 713/300 |
| 7,580,651 | B2 | 8/2009 | Namizuka et al. | |
| 7,859,693 | B2 * | 12/2010 | Ueno et al. | 358/1.14 |
| 7,894,085 | B2 * | 2/2011 | Maeda | 358/1.13 |
| 2003/0140260 | A1 * | 7/2003 | Kizawa et al. | 713/300 |
| 2004/0078610 | A1 * | 4/2004 | Naitoh | 713/300 |
| 2004/0268171 | A1 * | 12/2004 | Inoue et al. | 713/323 |
| 2005/0028015 | A1 * | 2/2005 | Asano et al. | 713/320 |
| 2005/0260009 | A1 | 11/2005 | Namizuka et al. | |
| 2006/0053318 | A1 * | 3/2006 | One | 713/300 |
| 2006/0236143 | A1 * | 10/2006 | Kidoguchi | 713/320 |
| 2007/0067136 | A1 * | 3/2007 | Conroy et al. | 702/130 |
| 2007/0094459 | A1 * | 4/2007 | Suzuki et al. | 711/156 |
| 2007/0233909 | A1 * | 10/2007 | Derr et al. | 710/36 |
| 2007/0260794 | A1 * | 11/2007 | Ashish et al. | 710/267 |

(Continued)

FOREIGN PATENT DOCUMENTS

| | | | | | |
|---|---|---|---|---|---|
| JP | | 08254922 A | * | 10/1996 | G03G 15/20 |
| JP | | 2002268778 A | * | 9/2002 | G06F 1/32 |

(Continued)

OTHER PUBLICATIONS

Perez-Costa, X.; Camps-Mur, D., "APSM: bounding the downlink delay for 802.11 power save mode," Communications, 2005. ICC 2005. 2005 IEEE International Conference on , vol. 5, pp. 3616,3622, May 16-20, 2005.*

(Continued)

*Primary Examiner* — Faisal M Zaman
(74) *Attorney, Agent, or Firm* — Oblon, Spivak, McClelland, Maier & Neustadt, L.L.P.

(57) ABSTRACT

The transition between a normal operation mode and a power save mode of an apparatus is controlled by determining whether a power save mode transition condition is satisfied, the power save mode transition condition defining a condition under which the normal operation mode is to be switched to the power save mode, and sending notification from a sub controller to a main controller when the power save mode transition condition is satisfied.

22 Claims, 16 Drawing Sheets

(56) References Cited

U.S. PATENT DOCUMENTS

| | | | |
|---|---|---|---|
| 2008/0158593 A1* | 7/2008 | Jo et al. | 358/1.15 |
| 2009/0193273 A1* | 7/2009 | Kobayashi et al. | 713/320 |
| 2009/0199022 A1* | 8/2009 | Fukuda | 713/300 |
| 2009/0235099 A1* | 9/2009 | Branover et al. | 713/322 |
| 2009/0259868 A1* | 10/2009 | Katoh | 713/324 |
| 2009/0287945 A1* | 11/2009 | Kim et al. | 713/323 |
| 2010/0058082 A1* | 3/2010 | Locker et al. | 713/320 |
| 2010/0083020 A1* | 4/2010 | Suzuki | 713/322 |
| 2010/0290074 A1* | 11/2010 | Kuroishi et al. | 358/1.14 |
| 2012/0191990 A1* | 7/2012 | Hodge et al. | 713/300 |
| 2013/0042119 A1* | 2/2013 | Bennett | 713/300 |

FOREIGN PATENT DOCUMENTS

| | | | | |
|---|---|---|---|---|
| JP | 2003-108273 | | 4/2003 | |
| JP | 2005-267100 | | 9/2005 | |
| JP | 2007-90830 | | 4/2007 | |
| JP | 2009-187289 | | 8/2009 | |
| JP | 2010118116 A | * | 5/2010 | G11B 19/00 |
| JP | 2011034401 A | * | 2/2011 | G06F 1/32 |
| JP | 2011235493 A | * | 11/2011 | B41J 29/38 |
| JP | 2012066534 A | * | 4/2012 | B41J 29/38 |
| JP | 2013034072 A | * | 2/2013 | H04N 1/00 |

OTHER PUBLICATIONS

Liebsch, M.; Perez-Costa, X., "Utilization of the IEEE802.11 power save mode with IP paging," Communications, 2005. ICC 2005. 2005 IEEE International Conference on , vol. 2, pp. 1383,1389, May 16-20, 2005.*

Sangkyu Baek; Bong Dae Choi, "Performance analysis of power save mode in IEEE 802.11 infrastructure WLAN," Telecommunications, 2008. ICT 2008. International Conference on , pp. 1,4, Jun. 16-19, 2008.*

Suhwan Kim; Kosonocky, S.V.; Knebel, D.R.; Stawiasz, K., "Experimental measurement of a novel power gating structure with intermediate power saving mode," Low Power Electronics and Design, 2004. ISLPED '04. Proceedings of the 2004 International Symposium on , pp. 20,25, Aug. 9-11, 2004.*

Japanese Office Action issued Aug. 20, 2013, in Japan Patent Application No. 2010-035189.

* cited by examiner

APPARATUS, SYSTEM, AND METHOD OF POWER SAVING CONTROL, AND POWER SAVING CONTROL PROGRAM

CROSS-REFERENCE TO RELATED APPLICATIONS

This patent application is based on and claims priority under 35 U.S.C. §119 to Japanese Patent Application No. 2010-035189, filed on Feb. 19, 2010, in the Japanese Patent Office, the entire disclosure of which is hereby incorporated herein by reference.

FIELD OF THE INVENTION

The present invention generally relates to controlling transition between a normal operation mode and a power save mode of an apparatus, and more specifically to an apparatus, method, system, and a computer program product, each capable of controlling transition between a normal operation mode and a power save mode of an apparatus.

BACKGROUND

The apparatuses with a function of power saving are described in various documents, for example, in Japanese Patent Laid-Open No. 2005-267100, Japanese Patent Laid-Open No. 2005-267097, and Japanese Patent Laid-Open No. 2005-269013. Japanese Patent Laid-Open No. 2005-267100 discloses an image forming apparatus that enters into a power saving mode when a certain period of time passes after a job is finished, when an instruction is given from a host PC connected to a network, or when an input is given with an operation panel.

SUMMARY

The inventor of the present invention has discovered that the image forming apparatus described in Japanese Patent Laid-Open No. 2005-267100 has a drawback. More specifically, when a sub-CPU is configured to process all network packets, the sub-CPU having a large structure is most likely to be needed, thus increasing power consumed during the power saving mode. When the power consumption thus increases during the power saving mode, the power saving effect decreases as a result.

Alternatively, when the sub-CPU is configured to process only particular network packets, the power consumption during the power saving mode can be reduced. However, the structure of the sub-CPU is not taken into consideration when a conditional judgment is made to enter into the power saving mode. Therefore, when the image forming apparatus enters into the power saving mode while network packets that cannot be processed by the sub-CPU are frequently transmitted, a main CPU frequently returns back to operation. In other words, transition to and recovery from the power saving mode are frequently repeated, and as a result, it is impossible to obtain power saving effect as expected. Further, a main control unit is turned on and off more frequently. As a result, this reduces the life of component parts.

In view of the above, there is a need for a technique to reduce the power consumed during the power saving mode and to reduce the frequency of recovery from the power saving mode, preferably at the same time. This further extends the life of component parts, which are turned off during the power saving mode.

Example embodiments of the present invention include an apparatus, system, method, and a computer program product, each capable of controlling the transition between a normal operation mode and a power save mode of an apparatus, by determining whether a power save mode transition condition is satisfied, the power save mode transition condition defining a condition under which the normal operation mode is to be switched to the power save mode, and sending notification from a sub controller to a main controller when the power save mode transition condition is satisfied.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a figure illustrating operational state, processing timing, and an I/O terminal of the main CPU and the sub-CPU when a power is turned on;

Figure 1:
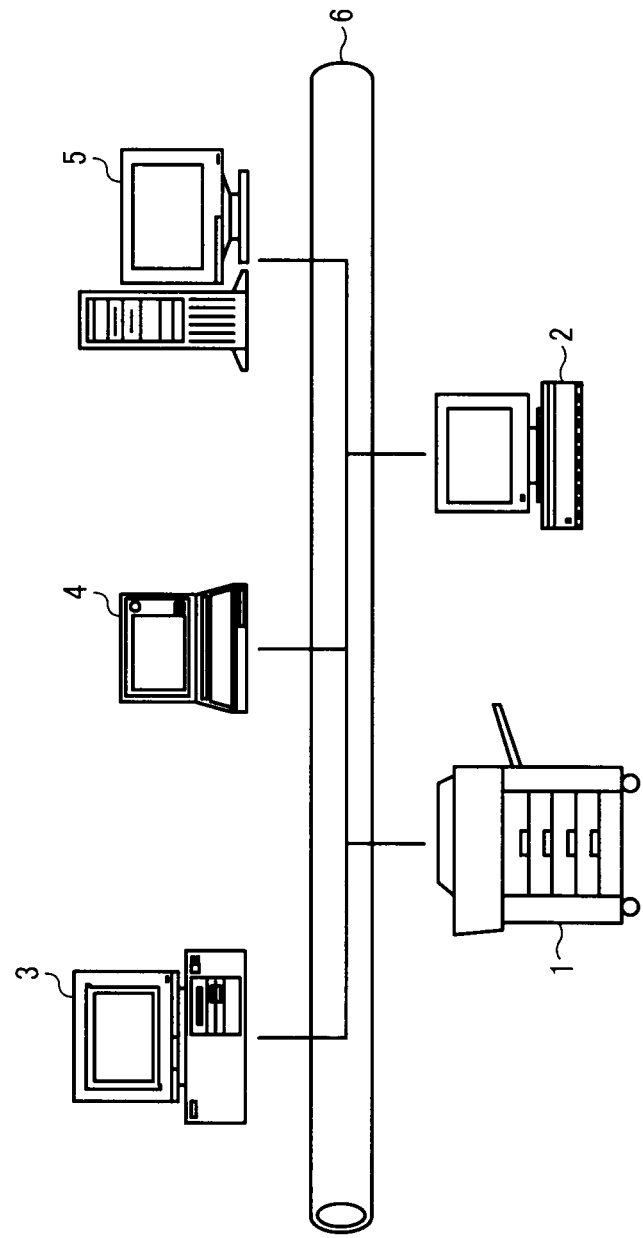
FIG. 1 is an illustration for explaining a configuration of a network system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates a configuration of a network system according to an embodiment of the present invention. The network system of FIG. 1 includes an image forming apparatus 1 including a plurality of functions such as the function of printing, and PCs 2, 3, 4, and 5 each of which uses the image forming apparatus 1. The image forming apparatus 1 and the PCs 2, 3, 4, and 5 are connected via a network 6. The numbers of image forming apparatus 1 and PCs 2, 3, 4, and 5 shown in FIG. 1 are merely examples. Alternatively, the network system of FIG. 1 may include any number of terminals or any number of image forming apparatuses. In this example, any one of PCs 2, 3, 4, and 5 causes the image forming apparatus 1 to perform printing operation by transmitting a print instruction to the image forming apparatus 1. Further, in this example, the network 6 is implemented by Ethernet, for example.

The image forming apparatus 1 of FIG. 1 may be implemented by any desired image forming apparatus of electrophotographic type or ink jet type.

Figure 2:
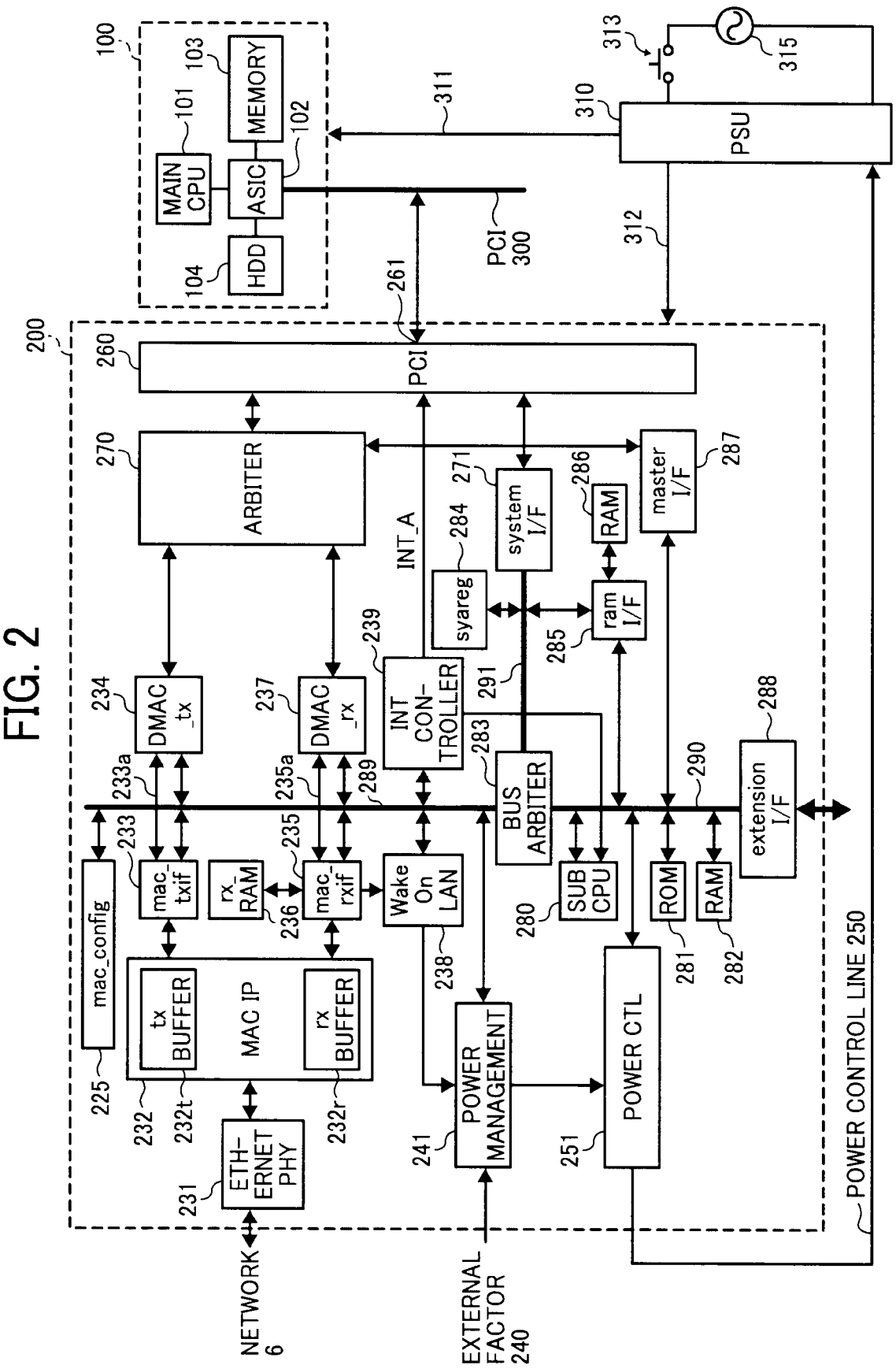
FIG. 2 is a block diagram illustrating a configuration of a control unit of the image forming apparatus shown FIG. 1.

FIG. 2 is a schematic block diagram illustrating a configuration of a control unit of the image forming apparatus 1 according to an example embodiment of the present invention. The system shown in FIG. 2 includes a controller 100, an interface unit (interface ASIC) 200, and a PCI bus 300 that connects the controller 100 and the interface unit 200.

The controller 100 includes a main CPU 101, an ASIC 102, a memory 103 and an HDD 104. The memory 103 or the HDD 104 stores image data transmitted via the network 6. The main CPU 101, the memory 103, and the HDD 104 are connected to the PCI bus 300 via the ASIC 102. The main CPU 101 controls operation of the image forming apparatus 1. The ASIC 102 controls input and output of data to and from the memory 103 and/or the HDD 104.

The interface ASIC 200 is connected to the network 6, an external factor input 240, and a power control line 250. The power control line 250 is connected to a power circuit unit (PCU) 310, which may be referred to as the power circuit 310. Power is supplied from the power circuit 310 to the controller 100 and the interface unit 200 through power lines 311 and 312 according to an instruction output through the power control line 250. The power circuit 310 is connected to a commercial power source 315 via a power switch 313. When the power switch 313 is turned on, power is firstly supplied to the interface unit 200. Subsequently, power is supplied to the controller 100 according to an instruction output through the power control line 250. When the image forming apparatus 1 switches to the power saving mode, the power line 311 is turned off according to an instruction given by the power control line 250.

The PCI bus 300 is connected to the PCI 260 of the interface ASIC 200 via an I/O terminal 261 of the PCI 260. The PCI 260 is connected to an arbiter 270 and a system interface 271 of the interface ASIC 200. Hereinafter, the interface may be referred to as "I/F".

The network 6 is connected with an Ethernet physical layer 231 and a MAC IP 232. The MAC IP 232 includes a tx buffer 232t and an rx buffer 232r. The tx buffer 232t and the rx buffer 232r are connected to mac_txif 233 and mac_rxif 235, respectively. The mac_txif 233 and mac_rxif 235 are connected to DMAC_tx 234 and DMAC_rx 237, respectively, via a bus 289. The DMAC_tx 234 and the DMAC_rx 237 are connected to the arbiter 270. It is noted that reference numerals 233a and 235a each represent a bus switching circuit. The mac_config 225 performs setting of the MAC_IP 232, the mac_txif 233, and the mac_rxif 235.

The mac_rxif 235 is also connected with rx_RAM 236 and Wake On LAN 238. The Wake On LAN 238 is connected to an interrupt controller 239 through a power management unit 241 and the bus 289. The power management unit 241 receives a factor from the external factor 240 and the Wake On LAN 238, and outputs a control signal to the power control unit 251. The Wake On LAN 238 includes a pattern filter. In the power saving mode as explained later, when a particular pattern is included in a packet received, the power management unit 241 instructs the power control unit 251 to turn on the main CPU 101 according to the included pattern. The packet referred to herein means a so-called network packet flowing on the network.

The power management unit 241 is connected to the bus 289. The power control unit 251, a sub-CPU 280, a ROM 281, a RAM 282, a ram IN 285, and a master I/F 287 are connected to the bus 290. The RAM 286 is connected to a bus 290 and a bus 291 through the ram I/F 285. The master I/F 287 is also connected to the arbiter 270. The arbiter 270 arbitrates each connection state of DMAC_tx 234 and DMAC_rx 237 according to a signal given by the master I/F 287. The bus 289, the bus 290, and the bus 291 are also connected to a bus arbiter 283. The bus arbiter 283 arbitrates the use of the bus 289, the bus 290, and the bus 291. The bus 291 is connected with a system register (sysreg) 284, and the bus 290 is connected with an extension I/F 288. In this example, the system register 284 stores version information for the interface ASIC 200. The stored version information is used for identification of an update of a corresponding packet and a bug found in the interface ASIC 200.

The sub-CPU 280 controls ON/OFF of the power to the main CPU 101 in the power saving mode. When it is determined that a process can be performed without use of the main CPU 101 in the power saving mode, the sub-CPU 280 executes the process without executing the main CPU 101. Conversely, in the normal mode in which the main CPU 101 operates, the main CPU 101 performs network processing.

The sub-CPU 280 uses a software timer to measure a time interval in which the sub-CPU 280 fails to reply with packets. When the measured time interval is determined to be more than a predetermined value stored in the RAM 286, the sub-CPU 280 notifies the main CPU 101 that a power saving mode transition condition is satisfied. The predetermined value stored in the RAM 286 may be changed through an operation unit of the image forming apparatus 1 or any one of the PCs 2, 3, 4, and 5 connected to the network 6.

The packets to which the sub-CPU 280 can reply can be increased by increasing the capacities of the ROM 281 and the RAM 286. However, when the sub-CPU 280 has more hardware, the power consumed by the sub-CPU 280 in the power saving mode increases. Therefore, the maximum power saving effect can be obtained by selecting the packets to which the sub-CPU 280 can reply, according to an environment where the image forming apparatus 1 is installed. Since the controller 100 and the interface unit 200 are connected via the PCI 300, the interface unit 200 can be easily replaced.

Figure 3:
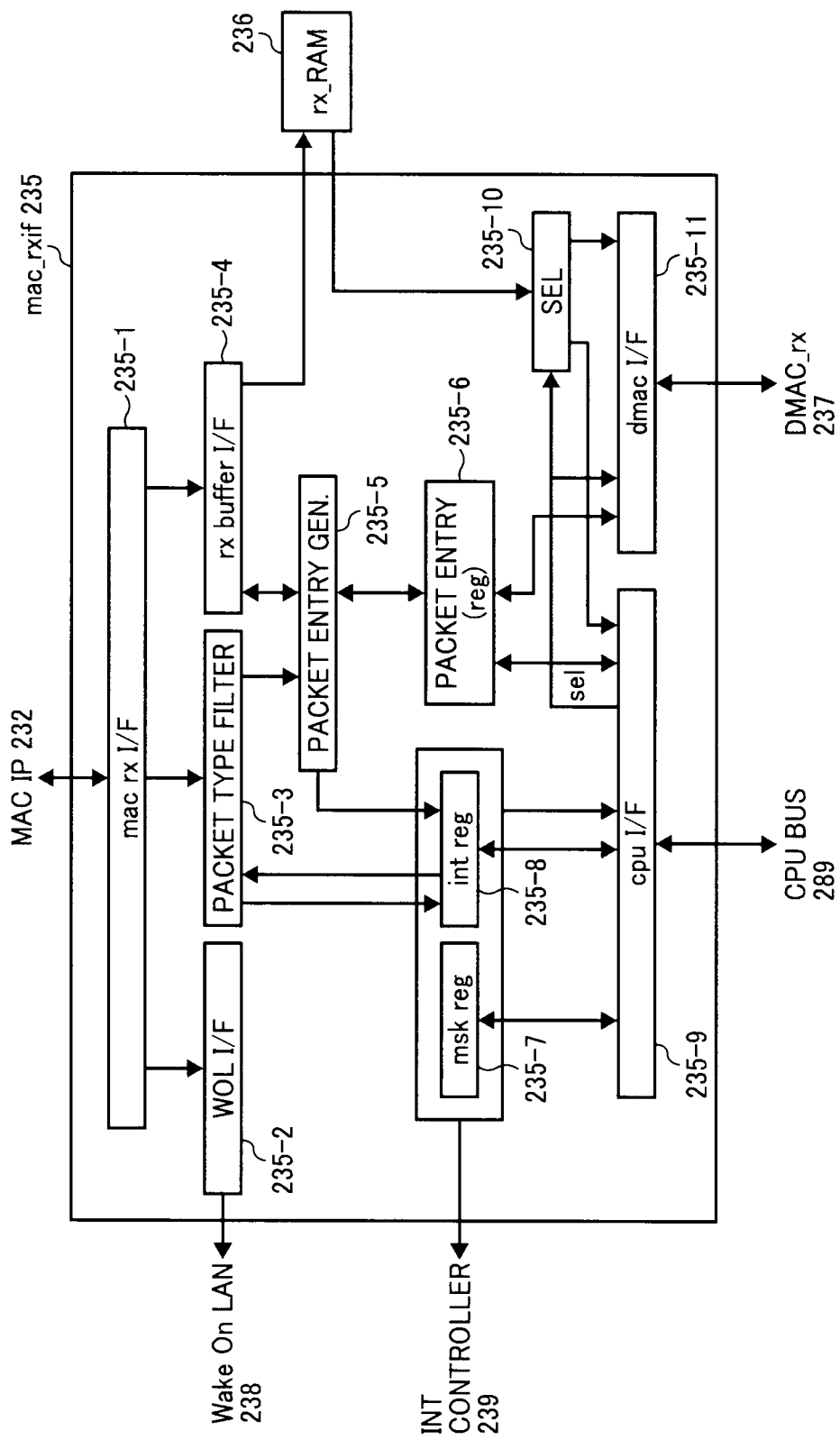
FIG. 3 is a block diagram illustrating an internal configuration of mac_rxif shown FIG. 2 in detail.

FIG. 3 is a block diagram illustrating an internal configuration of mac_rxif 235 in detail.

In FIG. 3, the mac_rxif 235 includes a mac rx I/F 235-1 functioning as an interface with the MAC IP 232, a WOL I/F 235-2 functioning as an interface with the Wake On LAN 238, a packet type filter 235-3, an rx buffer interface 235-4 functioning as an interface with the rx buffer 232r, a packet entry generator 235-5, a packet entry register 235-6, a mask register 235-7, an interrupt register 235-8, a cpu I/F 235-9, a selector 235-10, and a dmac I/F 235-11.

In this configuration, when data transmitted through the network 6 enters the MAC IP 232, the data is input to the WOL I/F 235-2, the packet type filter 235-3, and the rx buffer interface 235-4, respectively. The data is further input from the WOL I/F 235-2 to the Wake On LAN 238, from the packet type filter 235-3 to the interrupt register 235-8 and the packet entry generator 235-5, and from the rx buffer interface 235-4 to the rx_RAM 236, respectively. The data given from the rx_RAM 236 is input into the dmac I/F 235-11 or the cpu I/F 235-9 through operation of the selector 235-10 based on an instruction given by the sub-CPU 280.

When the packet type filter 235-3 selects a packet in which preset information is written, the packet type filter 235-5 notifies the packet entry generator 235-5 of whether the packet is to be selected or not. The packet entry register 235-6 instructs the rx buffer interface 235-4 to store specific information in the rx_RAM 236 based on the notification. In this manner, only the information selected by the packet type filter 235-3 is stored in the rx_RAM 236. The stored information is processed by the sub-CPU 280, which will be explained later.

Figure 4:
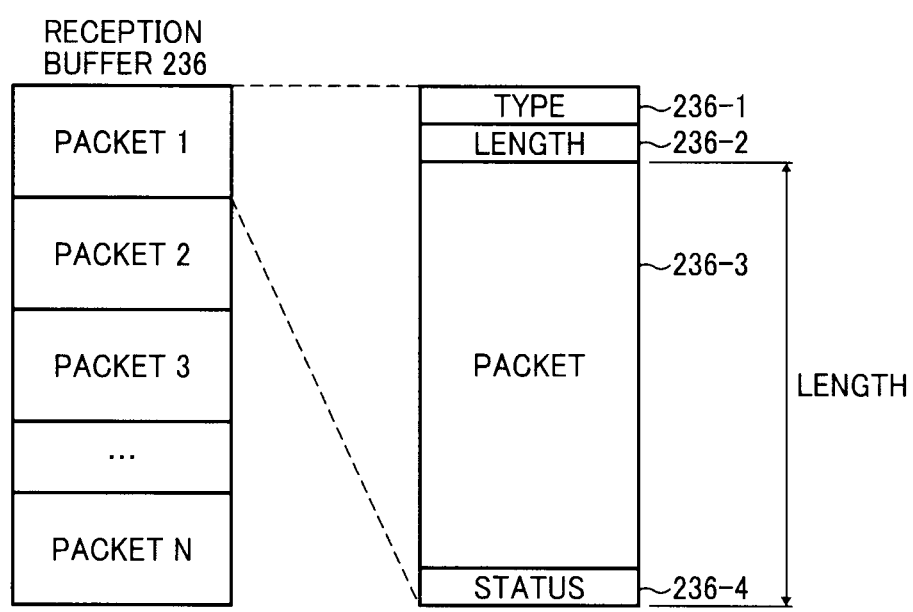
FIG. 4 is a figure illustrating a memory map of rx_RAM shown in FIG. 3.

FIG. 4 is illustrates a memory map of the rx_RAM 236 serving as a reception buffer. As illustrated in FIG. 4, the rx_RAM 236 includes TYPE 236-1, LENGTH 236-2, Packet 236-3, and Status 236-4. The Type 236-1 stores a number of a packet filter, which indicates at which filter a packet is received. The LENGTH 236-2 indicates a length of a received packet. The Packet 236-3 stores the contents of the received packet, such as contents of Packet 1 in this example. The Status 236-4 stores information for the received packet, i.e., packet information sent from the MAC IP 232.

The packet entry register 235-6 includes a function of address management for managing the association between identification of a packet and an address of rx_RAM 236 at which the packet is written. More specifically, the packet entry register 235-6 stores a header address of a packet N received by the rx_RAM 236. In the normal mode, all pieces of information are once stored to the rx_RAM 236 and sent from the dmac I/F 235-11 to the controller 100 through the DMAC_rx 237 to be processed by the main CPU 101.

An interrupt signal is output from a register (int reg 235-8, and msk reg 235-7), and is sent to the interrupt controller 239, where a predetermined interrupt is performed.

In the control unit configured in this manner, under the normal mode, after the main CPU 101 receives print data through a network, the ASIC 102 writes the print data to the memory 103 and sends the print data to a print engine for printing. In this state, the print data are input from the network 6 via the Ethernet physical layer 231, and transferred to the memory 103 via the rx buffer 232r of the MAC IP 232, the mac_rxif 235, the DMAC_rx 237, the arbiter 270, the PCI 260, the PCI bus 300, and the ASIC 102. Then, the print data is drawn in the memory 103. Conversely, when the data stored in the memory 103 or the HDD 104 are transmitted to another device, the data are sent to the network 6 via the ASIC 102, the PCI bus 300, the PCI 260, the arbiter 270, the DMAC_tx 234, the mac_txif 233, the tx buffer 232t of the MAC IP 232, and the Ethernet physical layer 231. It is noted that the data input to the mac_rxif 235 are once stored to the rx_RAM 236, and is then retrieved therefrom in such an order that those stored first are retrieved first, and are output from the mac_rxif 235 to the DMAC_rx 237.

The image forming apparatus 1 enters into the power saving mode when the image forming apparatus 1 does not detect, for a predetermined period of time, a network packet to which the sub-CPU 280 cannot respond. In the power saving mode, power is not supplied to the controller 100 including the main CPU 101. In other words, energization is not performed from the power supply circuit 310 that supplies power to the controller 100. This energization is controlled by the power controller 251 through the power control line 250. The power controller 251 controls ON/OFF of energization to the controller 100 based on an instruction given by the power management unit 241.

Transition from the normal mode to the power saving mode and transition from the power saving mode to the normal mode will be explained later. Because the drive power is not supplied to the controller 100 including the main CPU 101 in the power saving mode, the main CPU 101 does not operate in the power saving mode, and therefore, the memory 103 and the HDD 104 cannot be used in the power saving mode. In this state, portions related to the network 6, the external factor 240, and the power control line 250 are energized.

In the power saving mode, power supply to the controller 100 is cut off, and the sub-CPU 280 controls communication with the network 6. When data input through the network 6 can be processed by the sub-CPU 280, the power saving mode is continued as it is. However, when print data and data that cannot be processed by the sub-CPU 280 are input through the network 6, the print data and the data cannot be processed by the sub-CPU 280. Therefore, energization to the controller 100 is started, and the mode changes from the power saving mode to the normal mode.

In the power saving mode, a packet input from the network 6 to the image forming apparatus 1 is subjected to filtering in the packet type filter 235-3 of the mac_rxif 235. In other words, of input packets, a packet in which preset information is written is selected by the packet type filter 235-3, and the selected packet is stored to the rx_RAM 236. However, a packet in which the preset information is not written is overwritten, and therefore, practically, this packet is not stored therein.

Figure 5:
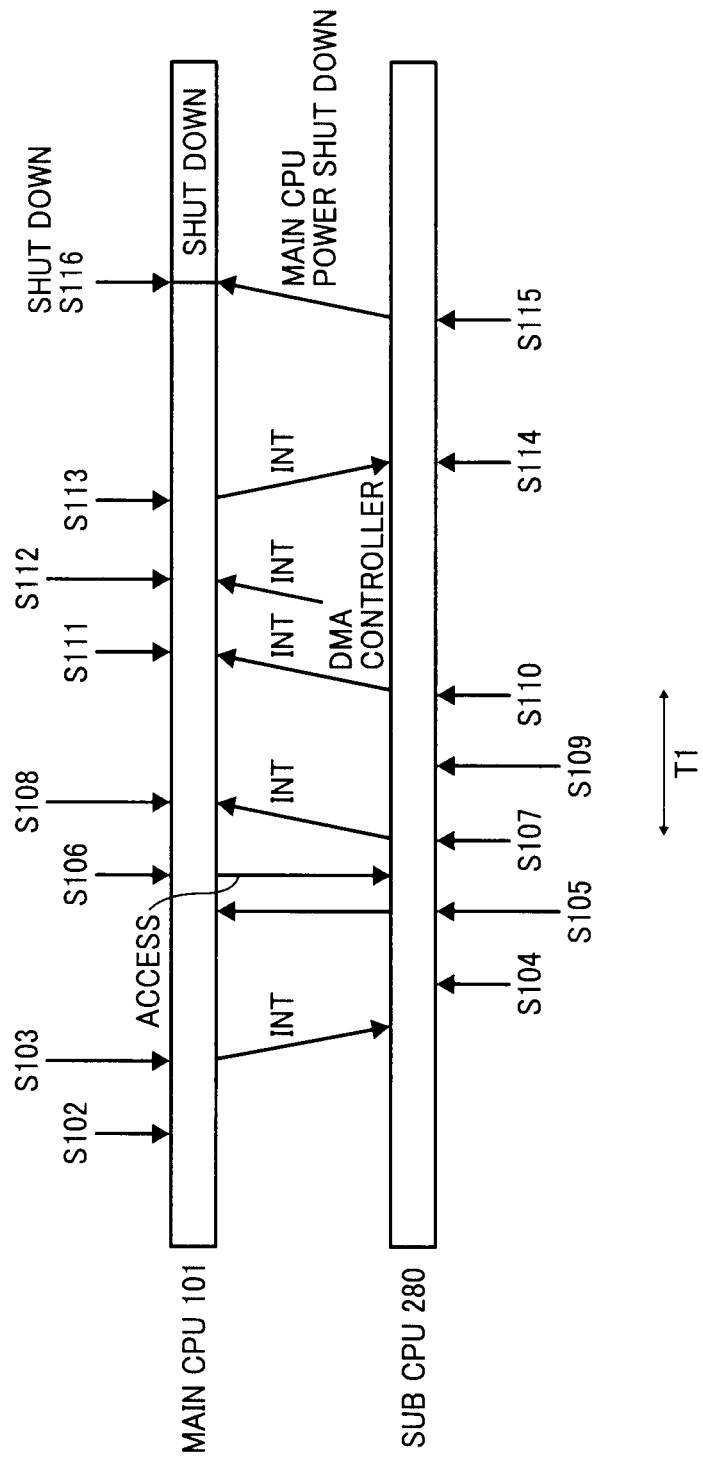
FIG. 5 is a figure illustrating operational states and processing timings of a main CPU and a sub-CPU during transition from a normal mode to a power saving mode.

FIG. 5 illustrates operational states and processing timings of the main CPU 101 and the sub-CPU 280 during transition from the normal mode to the power saving mode. In FIG. 5, in the normal mode, the main CPU 101 is in an operation state and the sub-CPU 280 is in an operation state.

At S102, the pattern filter provided in the Wake On LAN 238 is enabled. At S103, the interrupt controller 239 interrupts to output a power saving mode transition request to the sub-CPU 280. The power saving mode transition request is output, when a power saving mode transition permission notification is given by the sub-CPU 280 to the main CPU 101, or when a power saving mode transition condition is satisfied in the main CPU 101, which will be explained later.

For example, the power saving mode transition condition in the main CPU 101 is determined to be met when at least one of the following events occurs: 1) A preset time passes since the last job is completed; 2) A power saving mode transition instruction is given from any one of PCs 2, 3, 4, and 5 connected to the network 6; and 3) An input is given from the operation unit of the image forming apparatus 1, such as an operation panel. The power saving mode transition permission notification from the sub-CPU 280 to the main CPU 101 will be explained later. In FIG. 5, INT represents an interrupt.

When the power saving mode transition request is output to the sub-CPU 280, the sub-CPU 280 checks a factor of the power saving mode transition. The sub-CPU 280, after confirming the factor of the power saving mode transition, starts the power saving mode transition processing at S104. In the power saving mode transition processing, at S105, the sub-CPU 280 accesses the main CPU 101 to request the main CPU 101 to confirm setting information. In this example, the setting information includes information regarding the network 6 and information regarding the image forming apparatus 1. When the main CPU 101 receives setting information confirmation from the sub-CPU 280, at S106, the main CPU 101 transmits the setting information (step S106).

At S107, the sub-CPU 280 receives setting information confirmation from the main CPU 101, and the sub-CPU 280 transmits the transition preparation completion notification to the main CPU 101. At S108, the main CPU 101 checks the transition preparation completion notification, and enters into the power saving mode transition stage of the main CPU 101.

When the sub-CPU 280 completes the transition preparation to the power saving mode at S107, the sub-CPU 280 switches the packet transfer bus 289 to the sub-CPU 280 side by the bus switching circuits 233a and 235a, and the sub-CPU 280 starts the transmission/reception process at S109. The sub-CPU 280 waits until a transition cancellation grace monitoring time T1 elapses. When no factor to interrupt transition to the power saving mode occurs within the grace monitoring time T1, the sub-CPU 280 outputs a request for stopping DMAC_rx 237 to the main CPU 101 at S110. The grace monitoring time T1 is set to a time in which the main CPU 101 can complete at least processing of a packet received through the network 6 after the sub-CPU 280 completes power saving mode transition preparation. Due to this setting, communications between the network 6 and the system of the image forming apparatus 1 is not interrupted, and therefore, the packet that is received and is to be processed is reliably processed by the main CPU 101 or by the sub-CPU 280. The grace monitoring time T1 also corresponds to a time required for processing packets, transferred beforehand and not yet processed by the main CPU 101, still remaining in DMAC and the like even if the sub-CPU 280 switches the packet transfer bus to the sub-CPU 280 side at S109. However, after the grace time passes, the process in the main CPU 101 is already finished even if the DMAC_rx 237 is stopped, which does not cause any unprocessed packet to remain.

When the main CPU 101 receives the request for stopping the DMAC_tx 234 and the DMAC_rx 237 from the sub-CPU 280, the main CPU 101 stops DMA transfer at S111. When the main CPU 101 receives an interrupt from the DMAC_tx 234 and the DMAC_rx 237, the main CPU 101 confirms that the DMA transfer is stopped at S112. The main CPU 101 outputs a power saving mode transition request to the sub-CPU 280 at S113. When the sub-CPU 280 receives a power saving mode transition request from the main CPU 101, the sub-CPU 280 connects an I/O terminal to the side of the sub-CPU 280, and at S114, executes the process for the I/O terminal explained later so that unnecessary power consumption does not occur from an external terminal when the power to the main CPU 101 is turned off. At S115, the sub-CPU 280 stops a power supply to the controller 100 including the main CPU 101 in order to enter into the power saving mode.

The process for the I/O terminal is as follows. The system as shown in FIG. 2 controls the I/O terminal used in the PCI bus so that the I/O terminal attains a high impedance (Hi-Z) state before the power is shut down, and blocks a current to be flowed into the ASIC in the side where the power is shut down, by holding the I/O terminal in the Hi-Z state during power-down for promoting lower power consumption. By holding the I/O terminal in the Hi-Z state in the above manner, the power consumption is reduced, and in addition, this reduces malfunction and enhances the reliability of control. More specifically, the following risks cannot be avoided by just shutting down the power. Even when the power is shut down, malfunction may occur because charges stored during the power-down flow to the side that is not intended, or a short circuit may occur to cause a large current to flow and elements to break down. Therefore, in this example, the above events are prevented by setting the I/O terminal 261 to be the Hi-Z state. The power supply to the main CPU 101 is thereby cut off, and the controller 100 including the main CPU 101 enters into a shutdown state at S116. As a result, the transition to the power saving mode is completed, and a control right shifts from the main CPU 101 to the sub-CPU 280, and the sub-CPU 280 controls the image forming apparatus 1 until the power saving mode is cancelled.

The grace monitoring time T1 from S107 to S110 is a period that is provided so as to deal with a case where any factor that interrupts transition to the power saving mode occurs after the power saving mode transition preparation is completed. For example, when print information is contained in information received through the network 6, or when a packet that cannot be processed by the sub-CPU 280 is received, the main CPU 101 has to perform a printing process or a packet processing. In this case, the period is provided to cancel the transition to the power saving mode and returning back to the normal mode.

Figure 6:
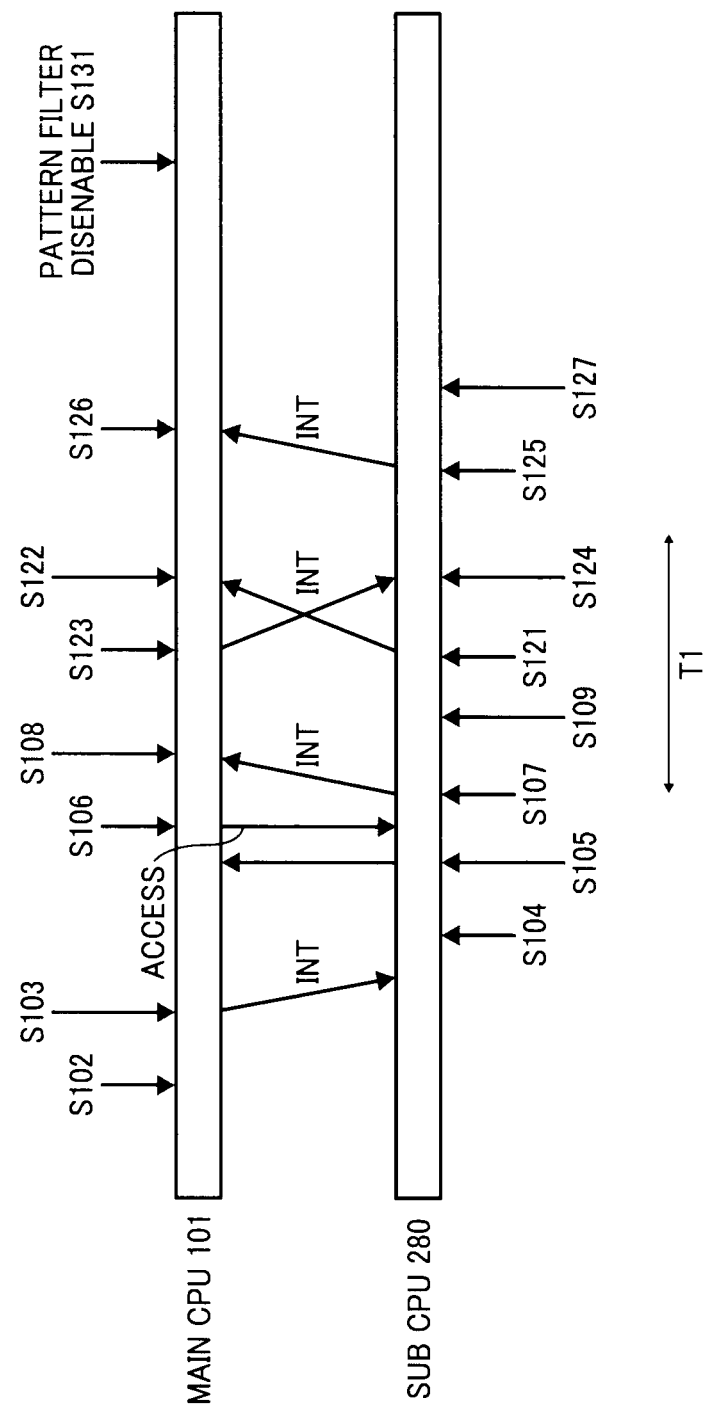
FIG. 6 is a figure illustrating operational states and processing timings of the main CPU and the sub-CPU when there occurs a factor for blocking transition to the power saving mode before a monitoring time passes.

FIG. 6 is a figure illustrating operational states and processing timings of the main CPU 101 and the sub-CPU 280 when there occurs a factor for blocking transition to the power saving mode before a monitoring time T1 passes. In this case, the processes from S102 to S109 are executed in the same manner and with the same timing as those of the transition to the power saving mode.

At S109, the sub-CPU 280 switches the packet transfer bus 289 to the side of the sub-CPU 280, and the sub-CPU 280 starts transmission/reception. When any factor that interrupts transition to the power saving mode occurs in the sub-CPU 280 during the transition cancellation grace monitoring time T1 by the sub-CPU 280, the transition preparation to the power saving mode is cancelled at S121, and a message about this cancellation is transmitted to the main CPU 101. When the main CPU 101 receives the message, the main CPU 101 cancels the transition to the power saving mode at S122. On the other hand, when any factor that interrupts transition to the power saving mode occurs in the main CPU 101, the power saving mode transition preparation is cancelled at S123, and a message about the cancellation is transmitted to the sub-CPU 280. When the sub-CPU 280 receives this message, the sub-CPU 280 cancels the transition to the power saving mode at S124. When there is any packet that has been received by the sub-CPU 280 and is to be processed in the main CPU 101 after the monitoring time T1 passes, the sub-CPU 280 transfers the packet to the main CPU 101 at S125, and the main CPU 101 receives the packet at S126.

For example, the factor that interrupts transition to the power saving mode includes the following cases. In the first case, a wake-up frame explained later is transmitted to the Wake On LAN 238. In the second case, a start button is pressed on the operation unit of the image forming apparatus 1, or an instruction is input to perform operation related to image forming operation, such as operating a pressure plate of an ADF (automatic document feeder). In the third case, data to be printed in the main CPU 101 is transferred from the network 6, or a packet that cannot be processed by the sub-CPU 280 is transmitted therefrom.

The packet to which the sub-CPU 280 cannot respond is, e.g., information about the engine. The information about the engine includes, e.g., various kinds of counter information, log information, and option attachment information. The information about the engine is stored to an NVRAM, not shown, managed by the main CPU 101. It is necessary to energize the main CPU 101 and retrieve information from the NVRAM. In some apparatuses and specifications, it may not be managed by the main CPU 101 but is managed by the NVRAM of the engine. Therefore, the sub-CPU 280 cannot respond to the packet.

Further, the sub-CPU 280 cannot respond to a protocol that is not supported by the sub-CPU 280. For example, in a case where the sub-CPU 280 supports only TCP/IP, the sub-CPU 280 cannot respond to Appletalk or NetBEUI. It is necessary to increase the capacity of the memory to support various protocols. When the image forming apparatus 1 is in the power saving mode, i.e., when the sub-CPU 280 is ON but the main CPU 101 is OFF, the power consumption increases. When the power consumption increases, the power saving effect is reduced.

When such a factor occurs, the image forming apparatus 1 cannot perform printing operation in the power saving mode. Therefore, the image forming apparatus 1 performs printing in the normal mode without entering into the power saving mode.

After the data is transmitted to the main CPU 101 at S125, the sub-CPU 280 switches back the packet transfer bus 289, which has been switched at S109, to the main CPU 101 side, and stops the process of data transmission/reception at S127. Then, the packet transfer bus 289 is switched back to the main CPU 101.

Since the sub-CPU 280 returns to the normal mode in this state, the main CPU 101 executes control so as to disable the pattern filter at S131, and fully returns to the normal mode. By controlling the processes in the above manner, even after the transition process to the power saving mode is started, it is possible to return to the normal mode without transition to the power saving mode. Furthermore, since both the main CPU 101 and the sub-CPU 280 operate during the transition and the returning periods, communication is not interrupted on the network 6. Accordingly, no data is lost.

Figure 7:
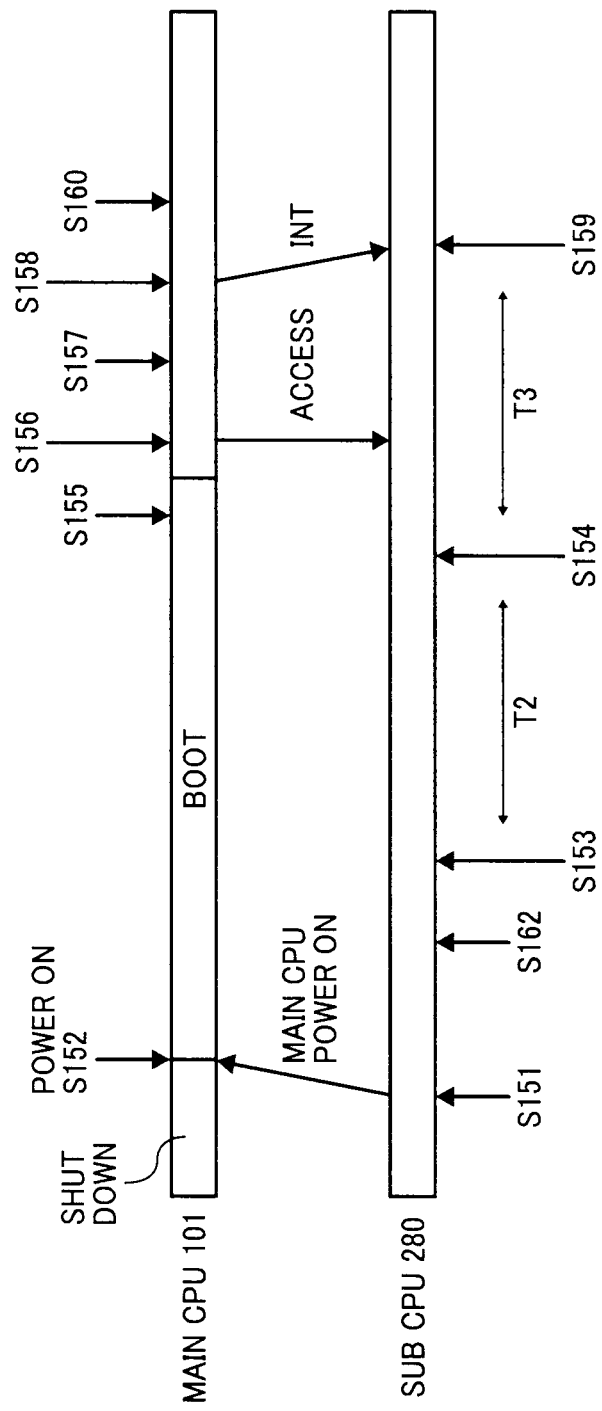
FIG. 7 is a figure illustrating operational states and processing timings of the main CPU and the sub-CPU during transition from the power saving mode to the normal mode.

FIG. 7 is a figure illustrating operational states and processing timings of the main CPU 101 and the sub-CPU 280 during transition from the power saving mode to the normal mode. The states of FIG. 7 indicate that the main CPU 101 is off (shut down) and the sub-CPU 280 operates in the power saving mode. In such states, when a factor to return from the power saving mode to the normal mode occurs in the sub-CPU 280 at S151, the sub-CPU 280 turns on the power to supply the power to the main CPU 101 at S152. The sub-CPU 280 executes the process for the I/O terminal at S162 and releases the Hi-Z state of the I/O terminal connected to the main CPU 101. By these operations, it is possible to block a current flowing into the main CPU 101 when the main CPU 101 is turned on upon transition from the power saving mode to the normal mode.

The factor to return from the power saving mode to the normal mode will be explained later in detail. For example, the factor includes the following cases. In the first case, the packet type filter 235-3 finds a particular packet, i.e., a SYN packet (SYN flag), contained in a packet received from the network 6. In the second case, a packet that cannot be processed by the sub-CPU 280 is received. In the third case, an operation signal before image forming process is input from the outside, e.g., there is an input given with the operation unit or the pressure plate of the ADF is operated. These above cases are the external factors. In the fourth case, the pattern filter provided in the Wake On LAN 238 detects a pattern indicating the return factor.

The power is turned on when the power controller 251 transmits a signal, indicating that the power is supplied to the main CPU 101, to the power supply unit 310 through the power control line 250. By turning on the power to the main CPU 101 in the above manner, the main CPU 101 executes boot process and executes a series of processes for start-up. On the other hand, the sub-CPU 280 continues processing the packets by disabling the pattern filter at S153 (T2). This is because the main CPU 101 is impossible to process packets since it is in the power-on state yet in the boot state, and it is necessary for the sub-CPU 280 to process the packet. The sub-CPU 280 continues processing the packets at S154 until a return factor packet (in this embodiment, SYN packet or a packet that cannot be processed by the sub-CPU 280) is detected. The sub-CPU 280 stops processing the packets when the sub-CPU 280 detects the return factor packet, and waits for an interrupt from the main CPU 101 (T3).

Detection of an interrupt factor at S154 indicates a case where after a packet is not input from the pattern filter by disabling the pattern filter at S153, the packet process in the sub-CPU 280 progresses, and the sub-CPU 280 detects the packet that causes the return factor. This means that there is no packet to be processed in the sub-CPU 280 hereinafter even if the main CPU 101 processes a packet.

The main CPU 101 confirms the factor for power-on at the end of the boot process at S155, and enters into an operation state. Then, the main CPU 101 accesses the sub-CPU 280, checks a setting condition at S156, and initializes a transmission/reception buffer (the tx_buffer 232*t* and the rx_buffer 232*r*) at S157. The main CPU 101 issues an interrupt and notifies the sub-CPU 280 that transition preparation to the normal mode is completed at S158. The sub-CPU 280 is waiting for the interrupt from the main CPU 101 at T3. Therefore, when the sub-CPU 280 confirms the interrupt at step S158, at S159, the transition to the normal mode is recognized, and the DMA transfer is started at S160.

The pattern filter disable at S153 is preferably set at an earlier time after the return factor occurs at S151. This is because the earlier time allows a lower possibility of overlap of power-on signals. Therefore, even in the recovery from the power saving mode to the normal mode, the communication is not interrupted on the network.

Figure 8:
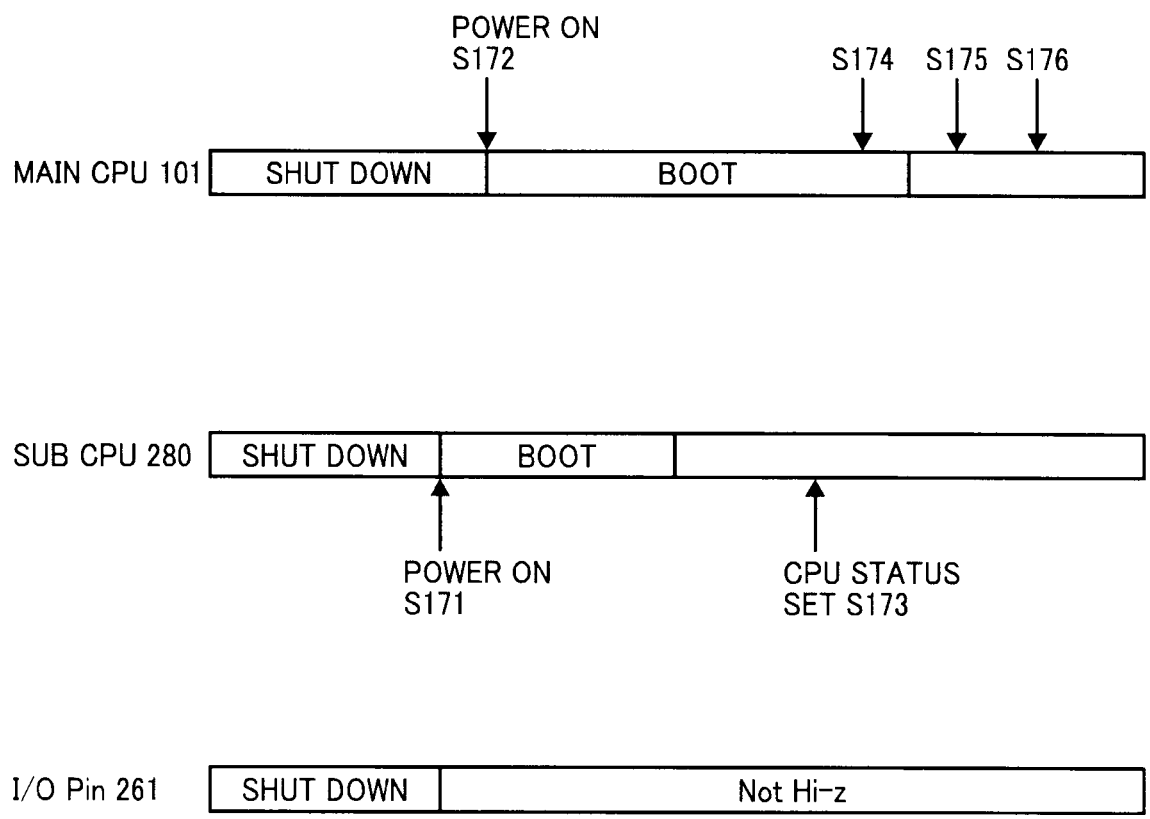

FIG. 8 is a figure illustrating operational state, processing timing, and an I/O terminal 261 of the main CPU 101 and the sub-CPU 280 when the power is turned on. In the embodiment, because the sub-CPU 280 controls the power to the main CPU 101, the power to the sub-CPU 280 is first turned on as shown in FIG. 8 at power-on at S171, and subsequently, the power to the main CPU 101 is turned on at S172. Thereafter, both of them execute the boot process. The sub-CPU 280 boots up first, and sets the state of the sub-CPU 280 in the RAM 286 at S173.

On the other hand, the main CPU 101 boots up after the main CPU 101 checks a factor for power-on, that is, a set content written in the RAM 286 at S174, initializes network-related components to enable communication with the network 6 at S175, and starts DMA transfer and communications at S176. Accordingly, the main CPU 101 enters into the operation state to operate in the normal mode.

In this embodiment, the main CPU 101 is in the same state as the state of the ASIC 100 of which power is controlled. The sub-CPU 280 is in the same state as the state of the ASIC 200 that controls the power. Therefore, the power saving mode transition state can be obtained from the state of the I/O terminal controlled by the sub-CPU 280. That is, immediately after the system is turned on, the I/O terminal that can be controlled in the Hi-Z state is not controlled in the Hi-Z state. In other words, when the main CPU 101 is in an active state, the I/O terminal of the sub-CPU 280 is not controlled in the Hi-Z state. However, it may be in the Hi-Z state for any given time as a part of ordinary functions.

Figure 9:
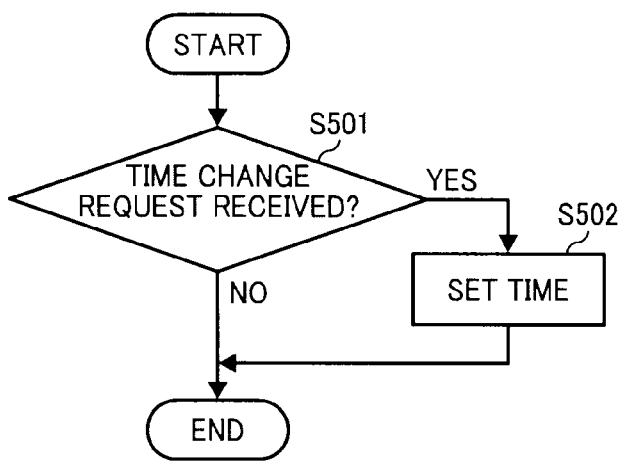
FIG. 9 is a flowchart illustrating a processing procedure for setting a time used as a reference by the sub-CPU for determining transition to the power saving mode.

FIG. 9 is a flowchart illustrating a processing procedure for setting a time used as a reference by the sub-CPU 280 for determining transition to the power saving mode. In FIG. 9, when a time change request for determining the transition to the power saving mode is given with an operation unit, not shown, of the image forming apparatus 1 and the PCs 2, 3, 4, and 5 connected to the network 6 at S501, the requested time is set at S502. When no request is given, no processing is executed. When a packet that cannot be processed by the sub-CPU 280 is not transmitted for the above time or more, the sub-CPU 280 determines that it is possible to enter into the power saving mode.

Figure 10:
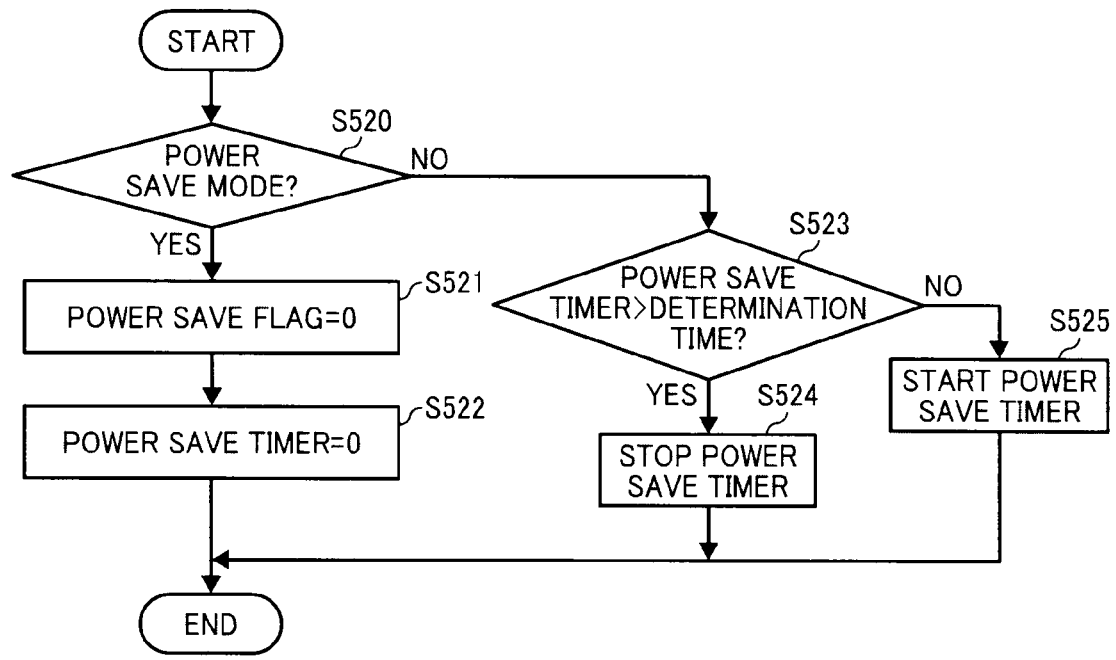
FIG. 10 is a flowchart illustrating an operational procedure of a power saving mode transition determination timer used by the sub-CPU.

FIG. 10 is a flowchart illustrating an operational procedure of a power saving mode transition determination timer used by the sub-CPU 280. In FIG. 10, a determination is made as to whether the image forming apparatus 1 is in the power saving mode or not at S520. In the power saving mode, at S521, a flag for permitting transition to the power saving mode is set at zero (since the image forming apparatus 1 is already in the power saving mode, it is impossible to change to the power saving mode), and the power saving mode transition determination timer is cleared at S522. When the image forming apparatus 1 is not in the power saving mode, a determination is made as to whether the power saving mode transition determination timer is more than the determination time set at S502 or at S503 of FIG. 9 (S523). When the power saving mode transition determination timer is determined to be more than the determination time, the power saving mode transition determination timer is stopped at S524. On the other hand, when the power saving mode transition determination timer is determined not to be more than the determination time, the power saving mode transition determination timer is operated at S525. The sub-CPU 280 thus controls the power saving mode transition determination timer, and compares the power saving mode transition determination timer with the determination time set by the setting processing as shown in FIG. 9, thus determining whether it is possible to enter into the power saving mode or not.

Figure 11:
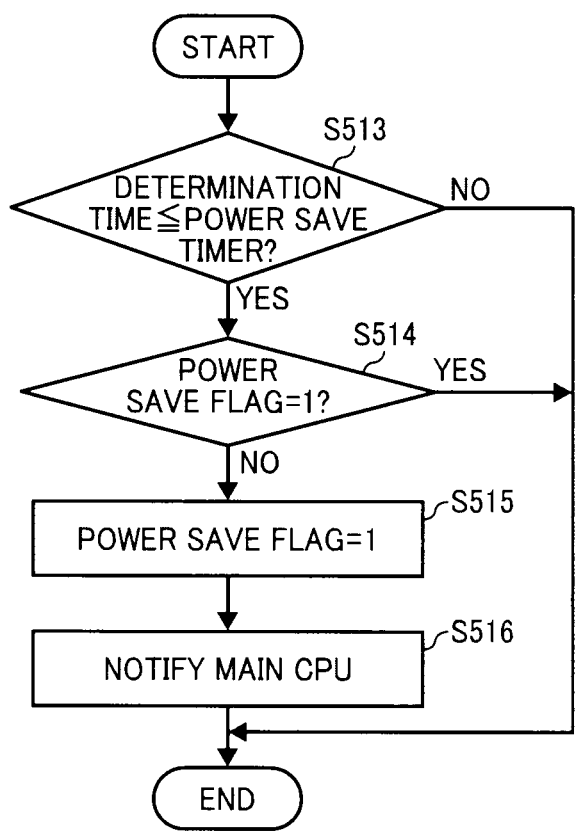
FIG. 11 is a flowchart illustrating a processing procedure of power saving mode transition possible notification.

FIG. 11 is a flowchart illustrating a processing procedure of power saving mode transition permission notification. In FIG. 11, the determination time and the value of the power saving timer are first compared in the power saving mode transition permission notification processing. When the value of the power saving timer is determined to be equal to or more than the determination time ("YES" at S513), and the power saving flag is determined to be zero ("NO" at S514), the power saving flag is set to 1 at S515, and the power saving mode transition permission notification is notified to the main CPU 101 at S516. When the value of the power saving timer is determined to be equal to or more than the determination time ("YES" at S513), and the power saving flag is determined to be already set ("YES" at S514), no processing is performed because the power saving mode transition permission notification has already been given. When the power saving timer is less than the determination time ("NO" at S513), no processing is performed.

By performing the processing as described above, when the packet that cannot be processed by the sub-CPU 280 is not transmitted for the certain period of time, the power saving mode transition permission notification can be notified to the main CPU 101.

Figure 12:
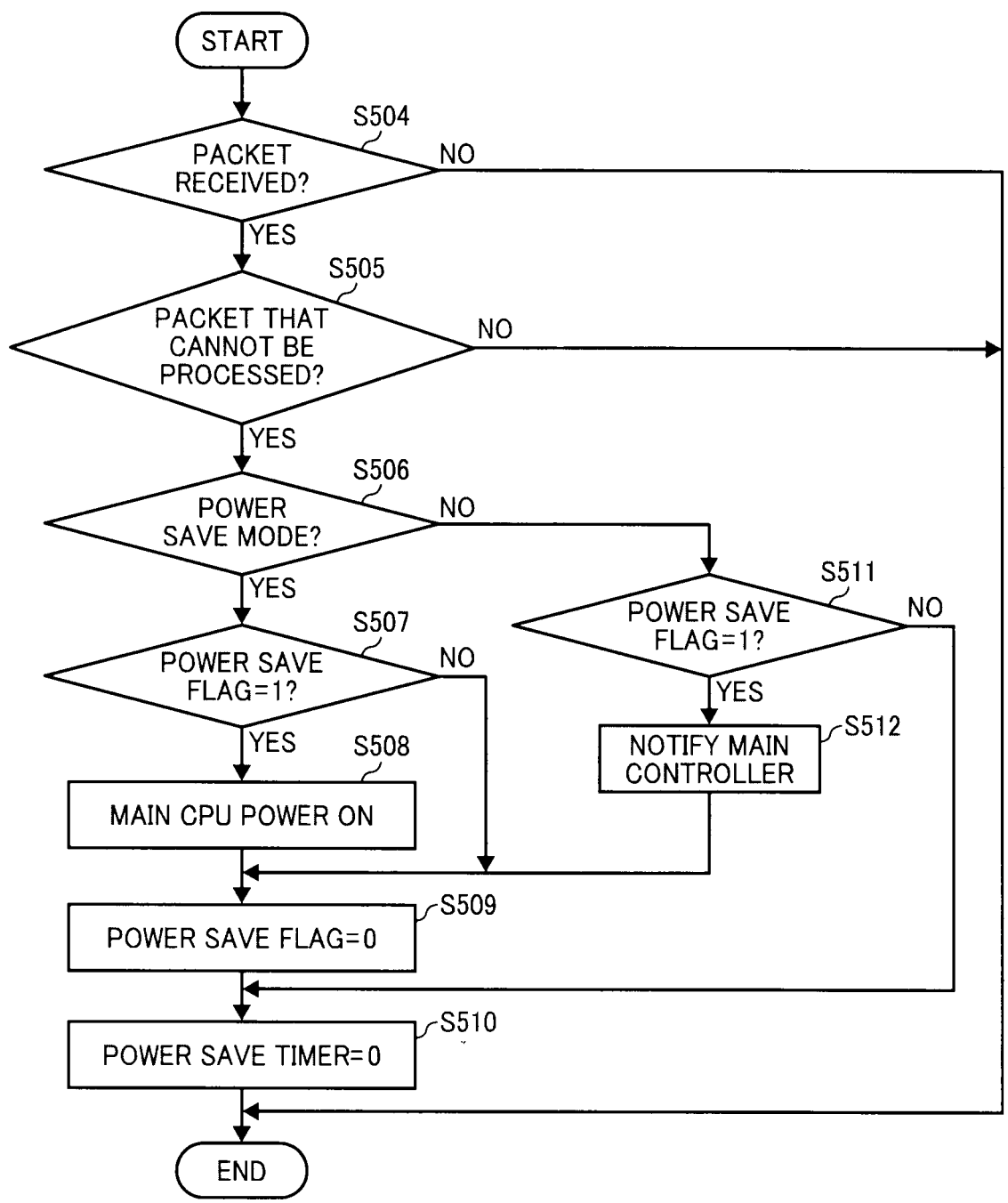
FIG. 12 is a flowchart illustrating a processing procedure of power saving mode transition cancellation notification processing.

FIG. 12 is a flowchart illustrating a processing procedure of power saving mode transition cancellation notification processing. In FIG. 12, S504 determines whether a packet is received. When a packet is received ("YES" at S504), a determination is made as to whether the received packet is a packet that can be processed by the sub-CPU 280 at S505. When the received packet is determined to be the packet that cannot be processed in this determination ("YES" at S505), a determination is made as to whether the image forming apparatus 1 is in the power saving mode at S506. When the image forming apparatus 1 is determined to be in the power saving mode in this determination, and the power saving flag is determined to be 1 ("YES" at S507), the power of the main CPU 101 performed at S151 of FIG. 7 is turned on at S508. As a result of this ON operation, the power saving mode is cancelled. Accordingly, the power saving flag is set at zero at S509, and the power saving timer is cleared at S510. When the packet that cannot be processed by the sub-CPU 280 is thus transmitted during the power saving mode, the image forming apparatus 1 recovers back from the power saving mode.

When the power saving flag is determined to be zero during the power saving mode in step S506 ("NO" at S507), this means that the image forming apparatus 1 is recovering from the power saving mode. Therefore, since it is not necessary to turn on the power of the main CPU 101, S509 is subsequently performed.

When the image forming apparatus 1 is determined not to be in the power saving mode and the power saving flag is determined to be 1 at S506 ("YES" at S511), this means that the power saving mode transition permission notification is already notified from the sub-CPU 280 to the main CPU 101. Therefore, a power saving mode transition cancellation notification is given to cancel this at S512. The power saving flag is cleared at S509, and the power saving timer is cleared at S510. By performing the control as described above, the notification for cancelling the power saving mode transition permission notification is given to the main CPU 101 when a packet that cannot be processed by the sub-CPU 280 is detected. When this occurs in the period T1 of FIG. 6, a transition preparation cancellation (step S121) is notified to the main CPU 101.

When no packet is received ("NO" at S504), or when a packet that can be processed by the sub-CPU 280 is received ("NO" at S505), the notification to the main CPU 101 and the clearing of the power saving timer are not performed.

Figure 13:
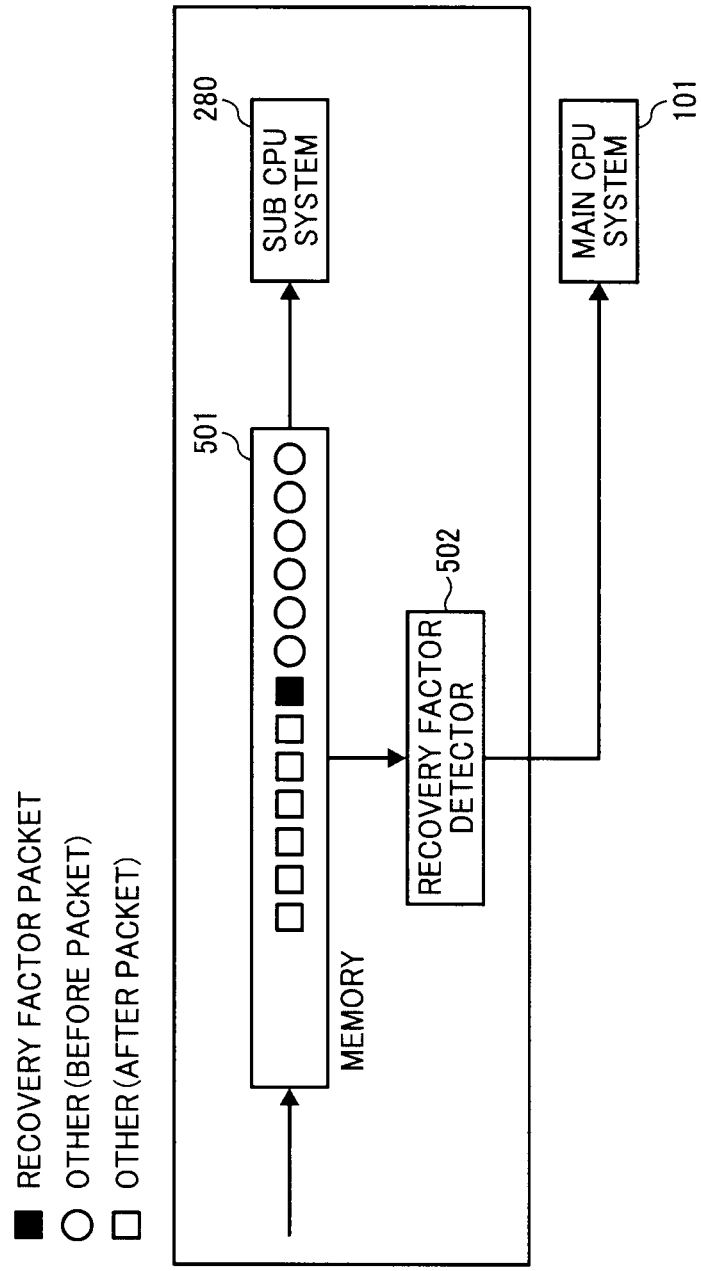
FIG. 13 is an explanatory diagram illustrating a configuration of a packet type filter.

As described above, in this embodiment, the packet type filter 235-3 and the pattern filter are used to select received packets, and predetermined processing is executed. FIG. 13 is an explanatory diagram illustrating a configuration of a packet type filter. A filter, which functions as a recovery factor detector 502, is used to detect a recovery factor packet indicated by a filled square among received packets 501. The sub-CPU 280 processes packets (those indicated by white circles in FIG. 13) until this recovery factor is detected, whereas the main CPU 101 processes packets (those indicated by white squares in FIG. 13) after the packet including the recovery factor packet is detected. In this processing, there is no interruption of packets received by the interface ASIC 200 even in the recovery from the power saving mode to the normal mode. Therefore, from the perspective from the network, it is possible to continue transmission. This will be hereinafter explained in detail.

Figure 14:
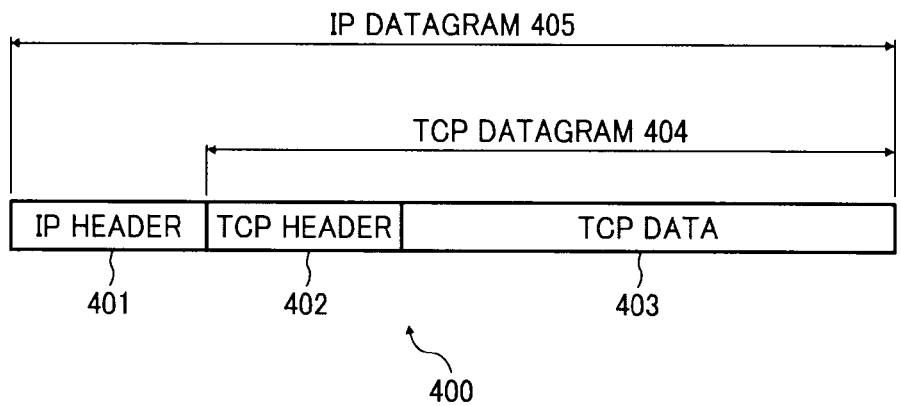
FIG. 14 is a figure illustrating a structure of an IP packet filtered by the packet type filter.

FIG. 14 is a figure illustrating a structure of an IP packet filtered by the packet type filter 235-3. In FIG. 14, the IP packet 400 includes an IP header 401, a TCP header 402, and TCP data 403. A TCP datagram 404 is structured by the TCP header 402 and the TCP data 403. An IP datagram 405 is structured by the TCP datagram 404 and the IP header 401.

Figure 15:
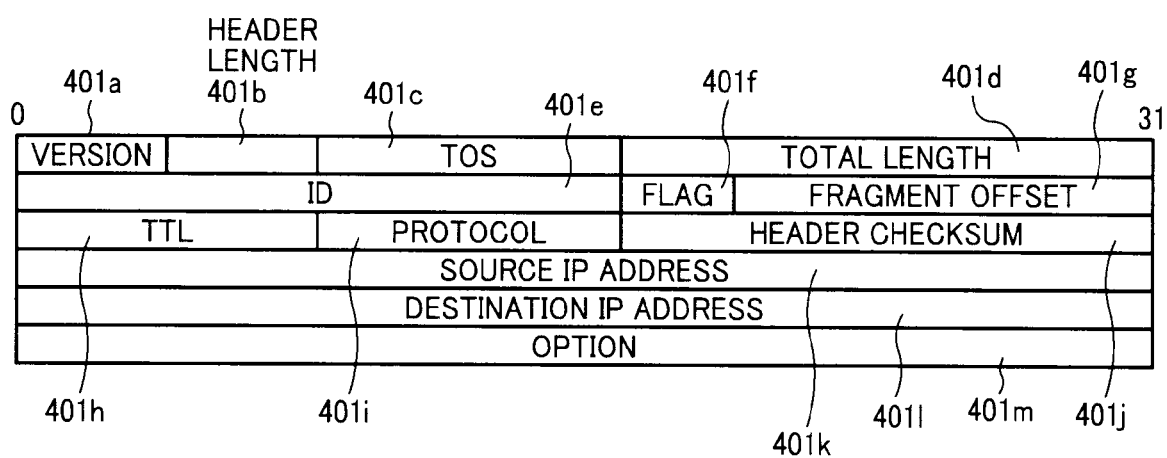
FIG. 15 is a figure illustrating an internal structure of a format of an IP header shown in FIG. 14.

FIG. 15 is a figure illustrating an internal structure of a format of an IP header 401 shown in FIG. 14, i.e., an IP header format. The IP header format includes a version information field 401a, a header length field 401b, a TOS (type of service) filed 401c, a total length (tos_len) field 401d, an identification (ID) field 401e, a flag field 401f, a fragment offset field 401g, a TTL field 401h, a protocol field 401i, a header checksum field 401j, a source IP address field 401k, a destination IP address field 401l, and an option field 401m.

In this structure, the version information field 401a is fixed at 4, and the header length field 401b represents a header length including an option region. The TOS field 401c represents a principle of preference in packet processing. The total length field 401d represents the total length of the IP packet 400. The identification field 401e and the fragment offset field 401g are used to achieve IP level fragment (dividing packets) and reassemble. The TTL field 401h represents a remaining lifetime of an IP packet on the network. The header checksum 401j represents a checksum of only an IP header portion.

Figure 16:
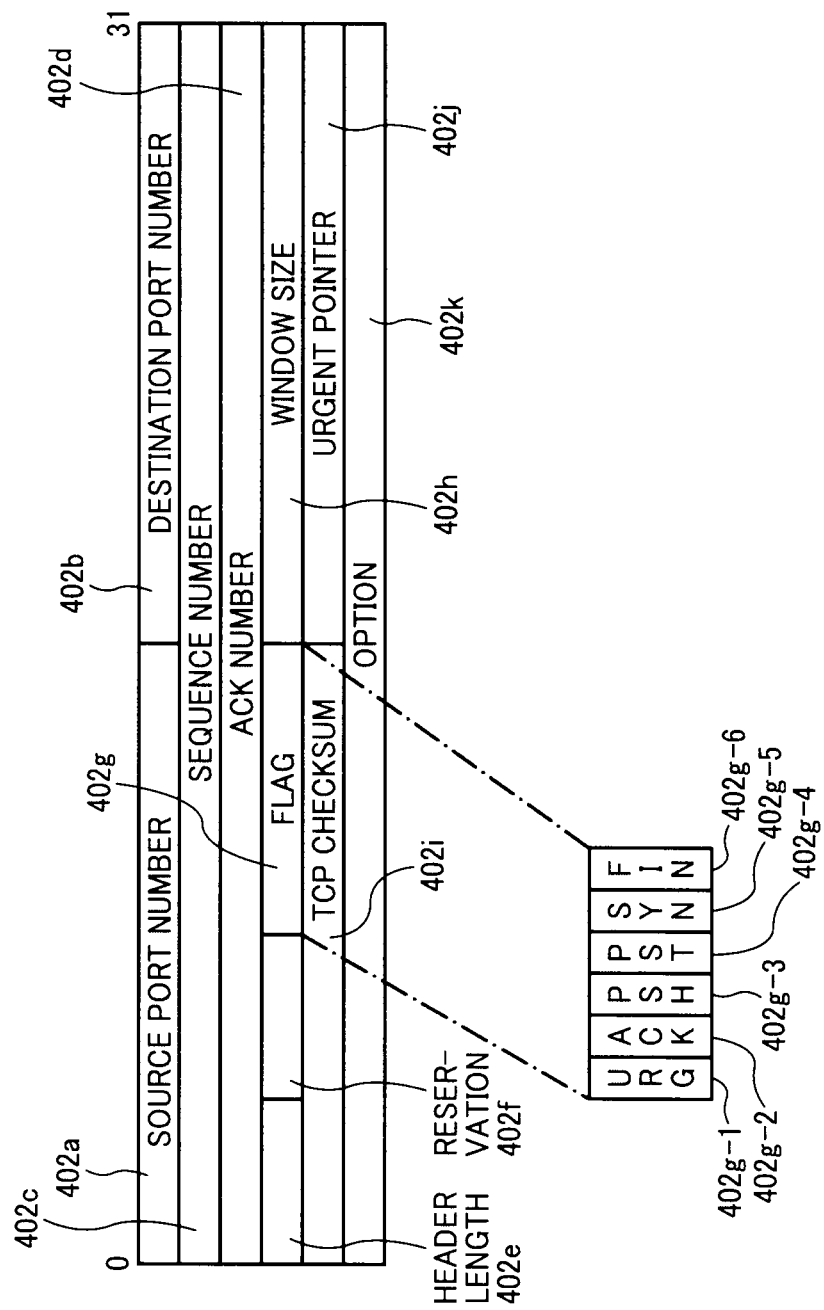
FIG. 16 is a figure illustrating an internal structure of a format of a TCP header shown in FIG. 14.

FIG. 16 is a figure illustrating an internal structure of the format of the TCP header 402 shown in FIG. 14, i.e., a TCP header format. The TCP header format includes a source port number field 402a, a destination port number field 402b, a sequence number field 402c, an acknowledgement number field 402d, a header length 402e, a reservation field 402f, a flag field 402g, a window size field 402h, a TCP checksum field 402i, an urgent pointer field 402j, and an option field 402k.

The source port number field 402a indicates a TCP port number of a source, and the destination port number field 402b indicates a TCP port number of a destination. The sequence number field 402c indicates in which part of a data stream a packet is located. A sequence number of acknowledgement (ACK) corresponding to a received packet is written in the acknowledgement number field 402d, and up to which part of the packet is received is notified to a sender. The header length field 402e indicates a TCP header length, and the header length changes according to presence or absence of the option field 402k. Six types of flags from URG to FIN are written in the flag field 402g, and the window size field 402h notifies the sender of the size of the window received. In the TCP checksum field 402i, calculation is carried out for both the TCP header and the data. The urgent pointer field 402j indicates the end of urgent data.

As shown with lead lines, the six types of flags of the flag field include a URG flag 402g-1, an ACK flag 402g-2, a PSH flag 402g-3, a RST flag 402g-4, a SYN flag 402g-5, and a FIN flag 402g-6. The URG (urgent) flag 402g-1 indicates that an urgent pointer of the urgent pointer field 402j is active. The ACK (acknowledgement) flag 402g-2 indicates that an acknowledgement number of the acknowledgement number field 402d is active, and generally, this flag is always on. The PSH (PUSH) flag 402g-3 indicates that data is transmitted as soon as possible. The RST (RESET) flag 402g-4 is a flag indicating a request for resetting a connection. The SYN flag 402g-5 is a flag indicating a request for establishment of a connection, and the FIN flag 402g-6 is a flag indicating a request for finishing the connection.

Figure 17:
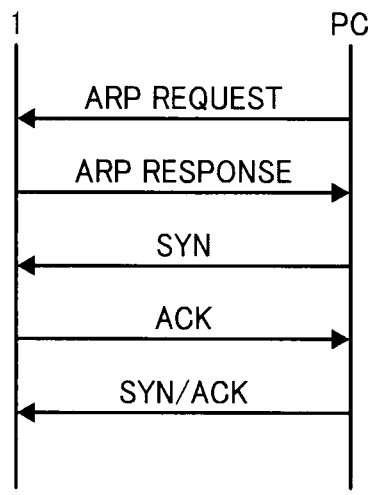
FIG. 17 is a figure illustrating a basic connection sequence of a TCP protocol.

FIG. 17 is a figure illustrating a basic connection sequence of a TCP protocol. In the connection sequence, any one of the PCs 2, 3, 4, and 5 transmits ARP (address resolution protocol) request to the image forming apparatus 1. When an ARP response is returned from the image forming apparatus 1, it is determined that the address, such as MAC address, is resolved. In this example, when the address is previously registered in the ARP table of the PC, these processes may be omitted. In response to the ARP response sent from the image forming apparatus 1, any one of the PCs 2, 3, 4, and 5 transmits SYN to the image forming apparatus 1. When an ACK is returned from the image forming apparatus 1, a TCP session is established, and the PCs 2, 3, 4, and 5 further transmit SYN/ACK to the image forming apparatus 1, and then communications are performed. In this example, the TCP session is established through 3 way handshake. Alternatively, any desired method may be used to establish connection between the image forming apparatus 1 and the PC.

In the embodiment, in addition to the packet type filter 235-3 provided in the mac_rxif 235, a pattern filter is provided in the Wake On LAN 238. Therefore, a packet is subjected to filtering by a pattern matching and a predetermined process is executed.

The function of the Wake On LAN 238 is a function that the image forming apparatus 1 can be started by another machine on the network. In this case, the image forming apparatus 1 may be started by the PCs 2, 3, 4, and 5. When the image forming apparatus 1 is in the power saving mode, the PCs 2, 3, 4, and 5 can start the image forming apparatus 1 by transmitting a wake-up frame. When the wake-up frame includes a correct MAC address, the image forming apparatus 1 returns from a standby or a suspend state and functions in the normal mode. Selection of this packet is performed by providing a field for 64-byte pattern matching in a packet to be received, and performing pattern matching between data written in the field and data preset in the pattern filter of the Wake On LAN 238. When a pattern is determined to match in the pattern matching, the Wake On LAN 238 wakes up the system. The wake-up of the system is performed in the following manner. The pattern filter performs pattern matching on a packet received by the Wake On LAN 238 through the WOLI/F235-2. When a pattern is determined to match in the pattern matching, it is determined that a wake-up frame has been received.

When it is determined that a wake-up frame is received, the Wake On LAN 238 instructs the power management unit 241 so that the power controller 251 turns on the power to the main CPU 101. The power controller 251 outputs an instruction to supply power from the power control line 250 to the power supply unit 310 based on the instruction, thus performing power control for the main CPU 101 and the entire system.

The determination of the wake-up frame corresponds to step S151 and step S152 of FIG. 7 in which a recover factor occurs, and accordingly, the main CPU 101 is turned on and recovers from the power saving mode to the normal mode. When the wake-up frame is detected, and the procedure for recovering from the power saving mode to the normal mode is started, it is not necessary to have the pattern filter in operation, and the pattern filter is disabled in step S153. As described above, a determination is made as to whether the pattern filter is used or not based on the power saving mode and the normal mode. The pattern filter is preferably used in the power saving mode. In the normal mode, it is not necessary to use the pattern filter.

Figure 18:
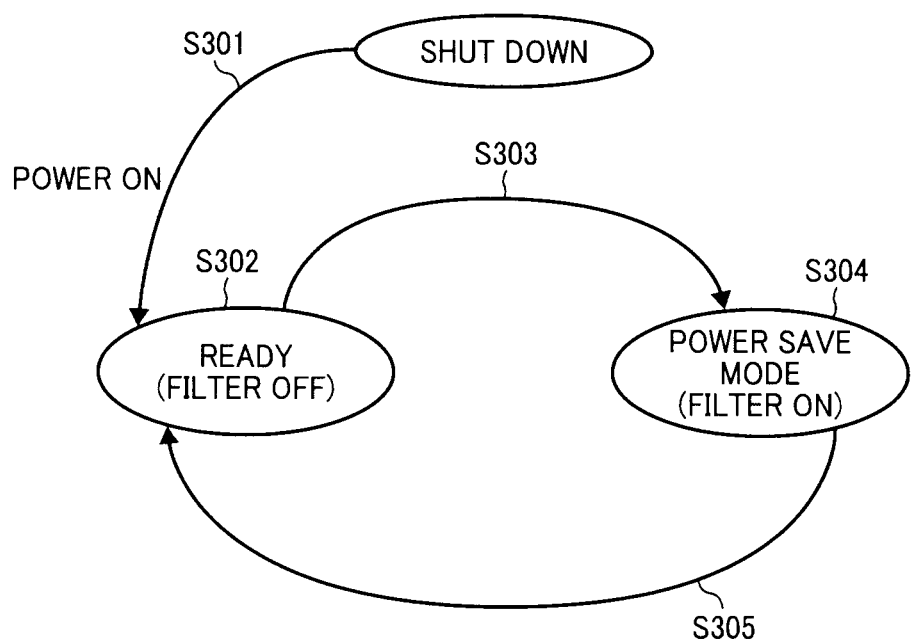
FIG. 18 is a power saving state transition figure illustrating state transition when a power saving mode transition request is given or when a power saving mode recovery request is given.

FIG. 18 is a power saving state transition figure illustrating state transition when a power saving mode transition request is given or when a power saving mode recovery request is given. As shown in FIG. 18, when the power is turned on at S301, the image forming apparatus 1 operates in the normal mode at first at step S302. At this occasion, the pattern filter is of When the main CPU 101 transmits the power saving mode transition request to the sub-CPU 280 at S303, the image forming apparatus 1 proceeds to the power saving mode at S304. At this occasion, the pattern filter is on. When a recovery factor occurs at S304, the image forming apparatus 1 recovers back to the normal mode in response to the power saving mode recovery request at S305. The pattern filter is then turned off. The power saving control is executed by repeating the pattern filter control between the normal mode (Ready state) and the power saving mode.

Figure 19:
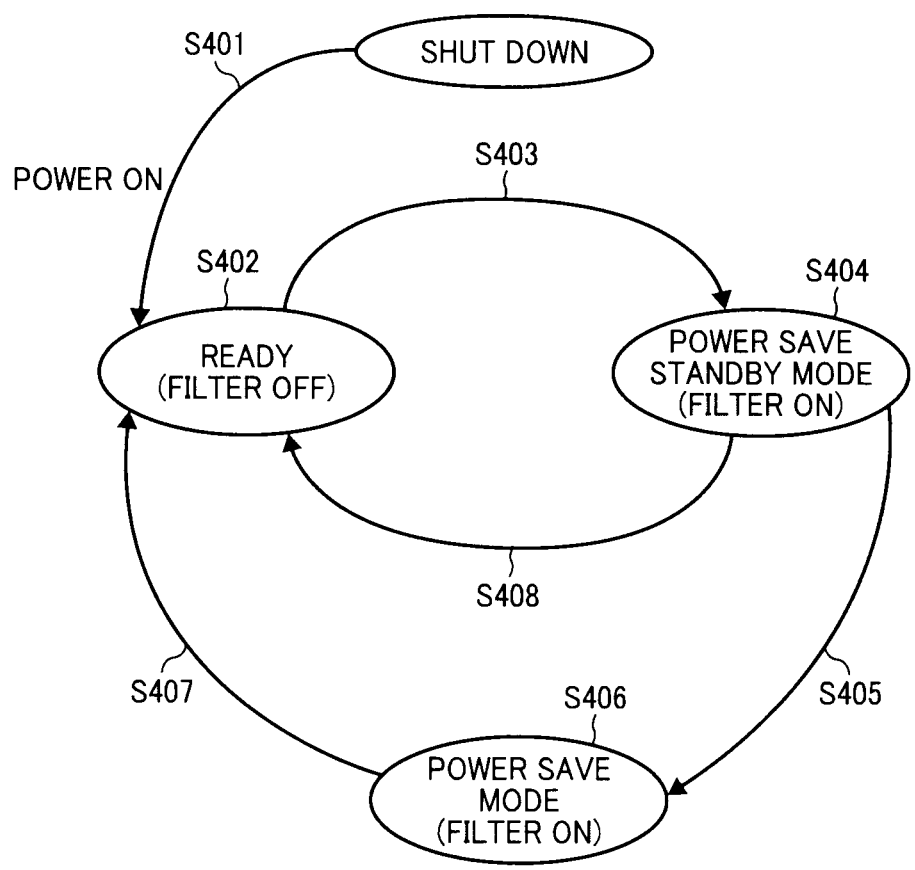
FIG. 19 is a power saving state transition figure illustrating transition state when a power saving mode transition request including a power saving mode transition cancel processing as shown in FIG. 6 is given, when a power saving mode recovery request is given, or when a power OFF request is given.

FIG. 19 is a power saving state transition figure illustrating transition state when a power saving mode transition request including a power saving mode transition cancel processing as shown in FIG. 6 is given, when a power saving mode recovery request is given, or when a power OFF request is given. In the transition in the power saving state, the transition figure of FIG. 18 includes the processings of S121 to S124 of FIG. 6.

That is, when the power is turned on at S401, the image forming apparatus 1 operates in the normal mode at first at S402. At this occasion, the pattern filter is in off-state. When the main CPU 101 transmits the power saving mode transition request to the sub-CPU 280 at S403, power saving mode transition is started. When transition preparation is completed, the packet transfer bus is switched, and whether the sub-CPU 280 cancels the transition or not is monitored at S404. This is referred to as a power saving standby mode. In this monitoring state, the pattern filter is on.

When a cancellation request of the power saving mode is detected in the power saving standby mode of S404, this is transmitted to the main CPU 101 at S408. Accordingly, the main CPU 101 returns back to ready state at S402, and the pattern filter is turned off When the transition cancellation grace monitoring time T1 passes in the power saving standby mode of S404, the image forming apparatus 1 enters into the power saving mode at S406 in response to the power saving mode transition request at S405. When a recovery factor occurs, the image forming apparatus 1 changes from the power saving state to the normal mode in response to the power saving mode recovery request at S407. The pattern filter is turned off, and the image forming apparatus 1 enters into the ready state (S402). Each of these steps is achieved by a computer program.

Program data are previously stored in the ROM and are extracted to the RAM, so that they are executed. Alternatively, the program data may be read and downloaded from a server connected to a network or from a known recording medium such as a CD-ROM, an SD card, and a magneto-optical disk each of which is loaded into a recording medium drive, not shown, as necessary or in response to a request for update and the like.

As described above, by allowing the sub-CPU 280 to determine a transition to the power saving mode, the power saving mode transition condition for the entire system can be changed by only changing the control configuration of the sub-CPU 280 without changing the control configuration of the main CPU 101.

In the power saving mode, the sub-CPU 280 performs packet processing, which is needed for maintaining the network connection. Therefore, the network connection can be maintained with a lower power consumption than in the normal mode.

When the network packet to which the sub-CPU 280 cannot respond is not detected for the certain period of time, the image forming apparatus 1 enters into the power saving mode. This reduces the frequency of recovery from the power saving mode, and extends the lifetime of components which are turned off in the power saving mode.

The detection time of the network packet to which the sub-CPU 280 cannot respond is configured to be variable. Therefore, the image forming apparatus 1 can determine transition to the power saving mode suitable for the network environment where the system is installed.

When the power saving control according to the present embodiment is applied to the image forming apparatus, the power saving control reduces the frequency the image forming apparatus recovers from the power saving mode, and extends the lifetime of the components in the image forming apparatus that are turned off in the power saving mode.

When the power saving control according to the present embodiment is applied to the image forming apparatus including client computer PCs 2, 3, 4, and 5, the power saving mode transition condition of the sub-CPU 280 can be changed with the client computer PCs 2, 3, 4, and 5.

The present invention is not limited to the present embodiment, and it is possible to make various modifications. All the technical matters included in the technical concept described in claims are the subject of the present invention.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In embodiments described above, the main control unit corresponds to a main CPU 101, the sub-control unit corresponds to a sub-CPU 280, a network corresponds to reference numeral 6, an image forming apparatus corresponds to reference numeral 1, and a packet corresponds to reference numeral 501.

According to the present invention, during the power saving mode, the sub-control unit processes packet needed for maintaining network connection. Accordingly, the network connection can be maintained with a lower power consumption than a normal mode, and when network packets to which the sub-control unit cannot reply are not detected for a certain period of time, the image forming apparatus enters into the power saving mode. Therefore, the number of times of recovery from the power saving mode can be reduced, and the life of component parts which are turned off during the power saving mode can be extended.

In one example, the present invention may reside in a network control apparatus, which includes a main controller to control entire system; and a sub controller to control a predetermined portion of the entire system. The network apparatus has at least two operation modes including a normal mode and a power save mode. The sub controller determines a power save condition at which the mode switches from the normal mode to the power save mode. When the sub controller determines that the power save condition is satisfied, the sub controller notifies the main controller that the power save condition is satisfied.

In another example, in the power save mode, the sub controller processes a packet that is required for maintaining network connections.

In another example, the sub controller determines that the power save condition is satisfied when a packet to which the sub controller cannot respond is not determined for a predetermined time period.

In another example, the predetermined time period in which the sub controller monitors for the packet to which the sub controller cannot respond is changeable.

In another example, any one of the above-described functions or operation is performed by a network control unit, which is incorporated in an image forming apparatus that forms an image onto a recording sheet.

In another example, the above-described image forming apparatus is connected to a plurality of client computers through a network. The image forming apparatus operates according to an instruction received from any one of the plurality of clients computers.

In another example, the present invention may reside in a power saving control method, performed by an apparatus including a main controller that controls entire system and a sub controller that controls a predetermined portion of the entire system. The apparatus is provided with at least two operation modes including a normal mode and a power save mode. The power save method includes determining, at the sub controller, whether a power save condition is satisfied; and notifying from the sub controller to the main controller when the power save condition is satisfied.

In another example, the present invention may reside in a recording medium which, when executed, cause a processor to perform any one of the above-described power save control methods.

What is claimed is:

1. An apparatus for controlling transition between a normal operation mode and a power save mode of the apparatus, the apparatus comprising:

a main controller to control entire system of the apparatus in the normal operation mode; and a sub controller to control a selected portion of the entire system of the apparatus in the power save mode, wherein the sub controller is further configured to:

determine whether a power save mode transition condition is satisfied, the power save mode transition condition defining a condition under which the normal operation mode is to be switched to the power save mode;

send a transition notification to the main controller when the power save mode transition condition is satisfied and begin a transition to the power save mode, wherein, during a specified time period, when the transition to the power save mode is interrupted for one of the main controller or the sub controller, a cancellation notification is sent to another one of the main controller or the sub controller, and the transition to the power save mode for each of the main controller and the sub controller is cancelled.

2. The apparatus of claim 1, wherein the selected portion of the entire system includes:

a portion to control packet processing required for maintaining a network connection between the apparatus and a network connected to the apparatus.

3. The apparatus of claim 1, wherein the sub controller is further configured to:

determine whether a received packet, to which the sub controller cannot respond, is received during the specified time period, and the power save condition is satisfied when the sub controller determines that the received packet, to which the sub controller cannot respond, is not received during the specified time period.

4. The apparatus of claim 3, wherein the specified time period has a value that is set according to a user instruction.

5. An image forming apparatus, comprising:
the apparatus of claim 1; and
an image forming device to form an image on a recording sheet.

6. A system, comprising:
the apparatus of claim 1; and
a personal computer connected to the apparatus of claim 1.

7. The apparatus of claim 1, wherein the transition to the power save mode is interrupted when print information is received via a network to which the apparatus is connected.

8. The apparatus of claim 1, wherein the transition to the power save mode is interrupted when a packet that cannot be processed by the sub controller is received.

9. The apparatus of claim 1, wherein the transition to the power save mode is interrupted when a wakeup frame is transmitted to a Wake On Local Area Network (LAN).

10. The apparatus of claim 1, wherein the transition to the power save mode is interrupted when an instruction related to an image forming operation is input.

11. The apparatus of claim 1, wherein the transition to the power save mode is interrupted when a start button on an operation display panel of the apparatus is selected.

12. The apparatus of claim 1, wherein the transition to the power save mode is interrupted when a pressure plate of an automatic document feeder of the apparatus is operated.

13. The apparatus of claim 1, wherein the transition to the power save mode is interrupted when data to be printed by the main controller is transferred from a network to which the apparatus is connected.

14. The apparatus of claim 1, wherein the transition to the power save mode is interrupted when a pressure plate of an automatic document feeder of the apparatus is opened.

15. The apparatus of claim 1, wherein the transition to the power save mode is interrupted when a pressure plate of an automatic document feeder of the apparatus is closed.

16. A method of controlling transition between a normal operation mode and a power save mode of an apparatus, the method comprising:
  controlling an entire system of the apparatus using a main controller in the normal operation mode;
  controlling a selected portion of the entire system of the apparatus using a sub controller in the power save mode;
  determining whether a power save mode transition condition is satisfied, the power save mode transition condition defining a condition under which the normal operation mode is to be switched to the power save mode;
  sending a transition notification from the sub controller to the main controller when the power save mode transition condition is satisfied and begin transitioning to the power save mode,
  wherein, during a specified time period, when the transition to the power save mode is interrupted for one of the main controller or the sub controller, a cancellation notification is sent to another one of the main controller or the sub controller, and the transition to the power save mode for each of the main controller and the sub controller is cancelled.

17. The method of claim 16, wherein the transition to the power save mode is interrupted when print information is received via a network to which the apparatus is connected.

18. The method of claim 16, wherein the transition to the power save mode is interrupted when a packet that cannot be processed by the sub controller is received.

19. The method of claim 16, wherein the transition to the power save mode is interrupted when an instruction related to an image forming operation is input via the apparatus.

20. The method of claim 16, wherein the transition to the power save mode for each of the main controller and the sub controller is cancelled only when the transition to the power save mode is interrupted during the specified time period.

21. The method according to claim 16, further comprising: transitioning to the normal operation mode when a packet type filter detects at least one factor of a plurality of factors, the packet type filter being enabled to detect the plurality of factors based on a received packet, the plurality of factors including: whether a network connection is being initiated, whether an operation signal preceding an image forming process is being received, and whether the received packet relates to engine information of the apparatus.

22. A recording medium storing a plurality of instructions which, when executed, cause a processor to perform a method of controlling transition between a normal operation mode and a power save mode of an apparatus, the method comprising:
  controlling an entire system of the apparatus using a main controller in the normal operation mode;
  controlling a selected portion of the entire system of the apparatus using a sub controller in the power save mode;
  determining whether a power save mode transition condition is satisfied, the power save mode transition condition defining a condition under which the normal operation mode is to be switched to the power save mode;
  sending a transition notification from the sub controller to the main controller when the power save mode transition condition is satisfied and begin transitioning to the power save mode,
  wherein, during a specified time period, when the transition to the power save mode is interrupted for one of the main controller or the sub controller, a cancellation notification is sent to another one of the main controller or the sub controller, and the transition to the power save mode for each of the main controller and the sub controller is cancelled.

* * * * *